(Model.)
G. R. MOORE.
SELF CLOSING VALVE AND FAUCET.
No. 246,684. Patented Sept. 6, 1881.
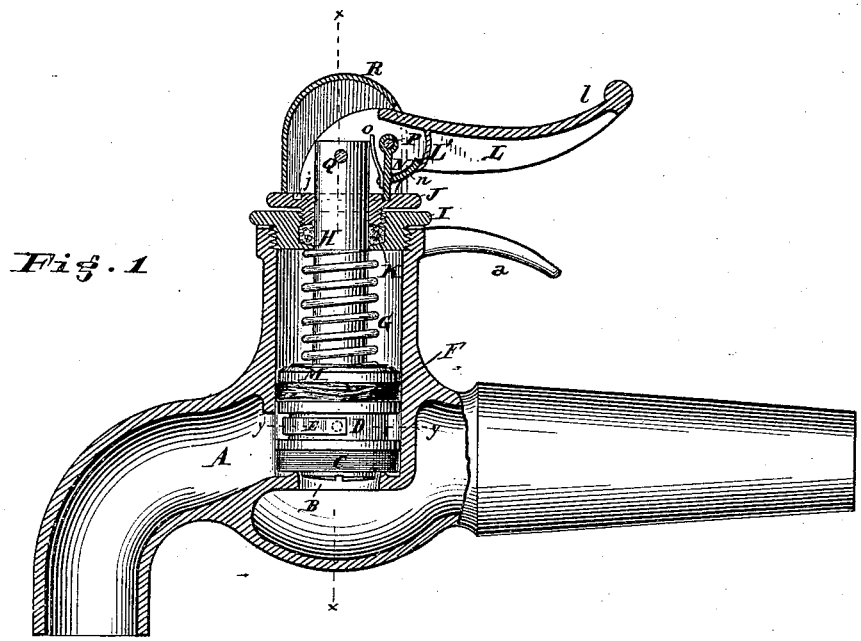
Fig. 1
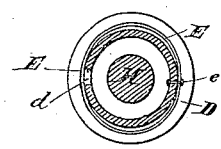
Fig. 6
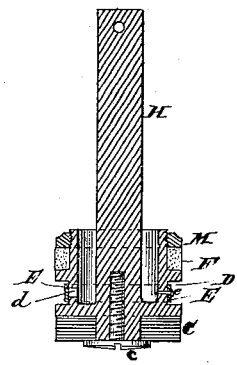
Fig. 2
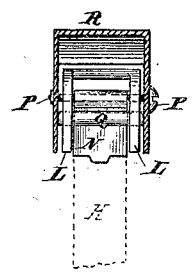
Fig. 5
Attests
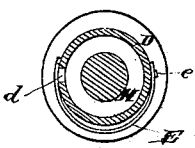
Fig. 3
Inventor
Geo. R. Moore

UNITED STATES PATENT OFFICE.

GEORGE R. MOORE, OF PHILADELPHIA, PENNSYLVANIA.

SELF-CLOSING VALVE AND FAUCET.

SPECIFICATION forming part of Letters Patent No. 246,684, dated September 6, 1881.

Application filed June 22, 1881. (Model.)

*To all whom it may concern:*

Be it known that I, GEORGE R. MOORE, of the city and county of Philadelphia, in the State of Pennsylvania, have invented new and useful Improvements in Self-Closing Valves and Faucets, of which the following is a specification, reference being had to the accompanying drawings, in which—

Figure 1 is a vertical section, showing all the parts of the valve in their proper relations to each other. Fig. 2 is a sectional view of the valve-stem and parts firmly united with it, for objects hereinafter to be named. Fig. 3 is a cross-section of the parts shown in Fig. 2, taken upon the line $y\ y$ in Fig. 1. Fig. 5 is a vertical section, taken at right angles with Fig. 1 upon the line $x\ x$. Fig. 6 is the same view as Fig. 3, and shows another mode of constructing and applying the spring-valve E to close the opening $d$ to the chamber above the valve. This is fastened at $e$.

A is the brass shell or casing, shown in this case in the usual form of a basin cock or faucet.

B is the valve-seat; C, the valve, held in place on the lower end of the valve-stem by the screw $c$.

D is a recess in the circular wall around the head of the valve-stem and rising above the valve. This recess affords room for the spring-valve E, which controls the aperture $d$, communicating to the variable chamber in the casing above the packing F.

F is an elastic packing for making the variable chamber, at the bottom of which it moves in the casing as tight as may be desired for a retard closing. It is forced against the wall of the casing by the screw M.

G is a strong spiral spring for closing the valve hard down upon its seat.

H is the valve-stem.

I is the removable head of the valve-casing through which the valve-stem operates. It is made to constitute, with the hollow screw-cap J, what is known in manufactures as a "stuffing-box," in which the packing K is held and made as tight as may be desired around the valve-stem by the hollow screw-cap J. In the top of the stuffing-box J is shown a small groove, $j$, which is a guide and place of bearing for the oscillating upright post N. This oscillating post does away with the rubbing-joint usually found in valves of this kind. It is nearly frictionless.

L is the operating-lever of the valve, and has its fulcrum in N upon the screw-pin P, which combines them. It is also pivoted by Q to the valve-stem H. As the fulcrum-pin P passes through N as well as the lever L and combines them, it will be seen that the circular portion $n$ upon N, with the part L' upon the lever L, moves on the same axis upon the same pin, so that no gap is left between them by the raising of the lever L.

$a$ is a curved prong or arm out from the casing, simply for a finger-rest, if desired to steady the hand by it in opening the valve.

$l$ is a thumb-piece at the end of the lever L.

$o$ is a spring upon N, to keep it from jarring out of its groove $j$.

R is a cap or removable casing for ornament and finish, as well as for the following functions: It keeps the pin Q in place. It remains at a fixed height and allows the stem of the valve to rise up within it as far as need be, unexposed and unobserved. It hides the oscillating post N. It closes down upon the top of the stuffing-box and gives a plain and easy surface to be cleaned and polished, while withal it allows the handle of the valve to be turned horizontally to any angle desired without any change of fastenings, as it is held down by a pin eccentric to the valve-stem, while horizontally the valve-stem is its axis.

The operation of this valve will be readily understood. To open it the lever L is pressed down and raises the valve C, and should the variable chamber in the casing above the valve be so entirely filled with water as to resist the raising of the valve because it implies the contraction of the chamber, the valve E yields enough to allow it to pass out at $d$ into the outlet. The valve being raised, the water passes freely up through its seat to the outlet.

The closing is done by the strong spring G, and begins the moment pressure is removed from the handle L. Its speed in closing is retarded and determined by the amount of leakage either past the packing F or the valve E, or both of them. The manufacturer will make the variable chamber sufficiently close to prevent the power of the spring closing the valve so quickly as to make a snapping noise. The fact that it closes against the pressure of the water favors the same purpose.

I have designed this valve for use with either hot or cold water. Whenever it is to be used for cold water only a cup leather packing in place of the packing F and valve E will often be preferred as cheaper and more simple.

The advantages of packing the stem of the valve, as shown by the stuffing-box I J, at all times accessible, must be apparent to all. Heretofore valves of this kind have been so packed that they required to be taken apart, if only to tighten the packing about the stem.

I claim—

1. In combination, the valve C, valve-stem H, spring G, stuffing-box I and J, arranged as shown, packing K, and operating-lever L, substantially as and for the purpose herein set forth.

2. In combination, the valve C and the circular wall above it containing the recess D, valve E, packing F, screw M, valve-stem H, spring G, and operating-lever L, substantially as and for the purpose herein set forth.

3. In combination, the valve C, valve-stem H, spring G, operating-lever L, and oscillating post N, connected to the lever and the valve-stem H by the pins P and Q, substantially as and for the purpose herein set forth.

4. In combination, the valve C, valve-stem H, spring G, operating-lever L, and cap R, inclosing the stem of the valve, substantially as and for the purpose herein set forth.

5. In combination, the valve C, valve-stem H, spring G, operating-lever L, and finger-rest a, substantially as shown.

6. In combination, the valve-stem H, oscillating post N, and operating-lever L, with their respective parts n and L' fitted to move in juxtaposition on their common axis P, preventing a gap in opening the valve, substantially as and for the purpose herein set forth.

7. In combination, the operating-lever L, oscillating post N, valve-stem H, and spring o, substantially as shown.

8. In combination, the operating-lever L, oscillating post N, valve-stem H, stuffing-box I and J, and groove j, substantially as shown.

GEO. R. MOORE.

Witnesses:
ELLWOOD BONSALL,
J. H. MYERS.